United States Patent
Tadiello et al.

(10) Patent No.: US 10,875,767 B2
(45) Date of Patent: Dec. 29, 2020

(54) PROCESS AND PLANT FOR COOLING SYNTHESIS GAS

(71) Applicant: L'Air Liquide, Societe Anonyme pour l'Etude et l'Exploitation des Procedes Georges Claude, Paris (FR)

(72) Inventors: Jean-Philippe Tadiello, Frankfurt am Main (DE); Yue Chen, Frankfurt am Main (DE)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 100 days.

(21) Appl. No.: 15/743,353

(22) PCT Filed: Jul. 4, 2016

(86) PCT No.: PCT/EP2016/025070
§ 371 (c)(1),
(2) Date: Jan. 10, 2018

(87) PCT Pub. No.: WO2017/008915
PCT Pub. Date: Jan. 19, 2017

(65) Prior Publication Data
US 2018/0201506 A1 Jul. 19, 2018

(30) Foreign Application Priority Data
Jul. 10, 2015 (EP) .................................... 15400030

(51) Int. Cl.
*C01B 3/48* (2006.01)
*C01B 3/38* (2006.01)
(Continued)

(52) U.S. Cl.
CPC ............ *C01B 3/48* (2013.01); *B01J 19/0013* (2013.01); *C01B 3/38* (2013.01); *C01B 3/50* (2013.01);
(Continued)

(58) Field of Classification Search
CPC ............................. C01B 3/48; B01J 19/0013
See application file for complete search history.

(56) References Cited

U.S. PATENT DOCUMENTS

| | | |
|---|---|---|
| 3,297,408 A | 1/1967 | Marshall, Jr. |
| 4,101,645 A * | 7/1978 | Nitschke .................. C01B 3/00 423/437.2 |

(Continued)

FOREIGN PATENT DOCUMENTS

| | | |
|---|---|---|
| DE | 10 2010 044939 | 12/2011 |
| EP | 2 233 433 | 9/2010 |
| EP | 2 865 638 | 4/2015 |

OTHER PUBLICATIONS

International Search Report and Written Opinion for PCT/EP2016/025070, dated Oct. 10, 2016.

*Primary Examiner* — Paul A Wartalowicz
(74) *Attorney, Agent, or Firm* — Justin K. Murray

(57) ABSTRACT

A process and a plant for cooling a synthesis gas produced by catalytic steam reformation of a hydrocarbonaceous feed gas, which is cooled by heat exchange with boiler feed water for its conversion into steam, by separating the resulting aqueous condensate, wherein the further cooling is effected in that the gas passes through several series-connected cooling stages and comprises the heat exchange with the feed gas, with degassed and non-degassed boiler feed water for generating the steam required for the steam reformation, and with ambient air, and wherein condensate obtained after the last cooling stage is separated from the gas and the gas is discharged for the further treatment, wherein at least after
(Continued)

a further cooling stage upstream of the last cooling stage a hot aqueous condensate is separated from the gas.

10 Claims, 3 Drawing Sheets

(51) Int. Cl.
*C01B 3/50* (2006.01)
*B01J 19/00* (2006.01)

(52) U.S. Cl.
CPC ..... *C01B 3/506* (2013.01); *B01J 2219/00074* (2013.01); *C01B 2203/0233* (2013.01); *C01B 2203/0283* (2013.01); *C01B 2203/04* (2013.01); *C01B 2203/0495* (2013.01); *C01B 2203/0883* (2013.01)

(56) References Cited

U.S. PATENT DOCUMENTS

| | | |
|---|---|---|
| 8,904,970 B2 | 12/2014 | Von Trotha et al. |
| 2003/0110694 A1 | 6/2003 | Drnevich et al. |
| 2007/0124997 A1* | 6/2007 | Liu ........................ B01J 8/0055 48/198.7 |
| 2008/0038185 A1* | 2/2008 | Freitag ...................... C01B 3/34 423/580.1 |
| 2008/0112882 A1* | 5/2008 | Zwierschke ............. C10J 3/005 423/648.1 |
| 2009/0232729 A1 | 9/2009 | Genkin et al. |
| 2011/0146991 A1 | 6/2011 | Palamara et al. |
| 2014/0148519 A1 | 5/2014 | Drnevich et al. |
| 2014/0319425 A1* | 10/2014 | Chakravarti ............ C01B 3/384 252/373 |

\* cited by examiner

PROCESS AND PLANT FOR COOLING SYNTHESIS GAS

CROSS REFERENCE TO RELATED APPLICATIONS

This application is a § 371 of International PCT Application PCT/EP2016/025070, filed Jul. 4, 2016, which claims the benefit of EP15400030.1, filed Jul. 10, 2015, both of which are herein incorporated by reference in their entireties.

FIELD OF THE INVENTION

This invention relates to a process and a plant for cooling a synthesis gas produced by catalytic steam reformation of a hydrocarbonaceous feed gas and by succeeding catalytic carbon monoxide conversion by separation of the resulting aqueous condensate, wherein cooling is effected in that the gas passes through several series-connected cooling stages, wherein cooling comprises the heat exchange with the feed gas, with degassed and non-degassed boAiler feed water for generating the steam required for the steam reformation, and with ambient air, and wherein condensate obtained after the last cooling stage is separated from the gas and the gas is discharged for the further treatment.

This invention furthermore relates to the use of the condensate.

BACKGROUND OF THE INVENTION

Processes for the production of synthesis gas containing hydrogen and carbon monoxide by means of catalytic steam reformation are known and described for example in Ullmann's Encyclopedia of Industrial Chemistry, Sixth Edition, Vol. 15, Gas Production, Chapter 2. The feed gases, a hydrocarbonaceous gas, such as e.g. natural gas and steam, are passed through externally heated reactor tubes filled with catalyst at elevated pressure, e.g. 20 to 35 bar, and high temperature, e.g. 800 to 950° C. The feed gases are converted into synthesis gas rich in hydrogen and carbon monoxide. Such reactor frequently is referred to as SMR, and the process is referred to as SMR process, an abbreviation for Steam-Methane-Reformer. For the economy of the process it is very important to carry out a rather effective heat exchange between the synthesis gas exiting from the SMR and the feed gases.

After the generated synthesis gas has left the SMR, it is cooled by heat exchange with boiler feed water. The boiler feed water is evaporated thereby. The steam is used as feed steam for the SMR process and excess steam is discharged as so-called export steam for use outside the SMR process. When a synthesis gas exclusively consisting of hydrogen is to be generated as end product of the SMR process, the synthesis gas subsequently is treated in a plant for the catalytic conversion, in which the carbon monoxide is converted with steam into hydrogen and carbon dioxide. This conversion is described in the above-mentioned Ullmann volume on pages 382 ff.

The process according to the invention relates to the further cooling of the synthesis gas subsequent to the steps described so far.

The synthesis gas initially is cooled further by heat exchange with the hydrocarbonaceous feed gas. Subsequently, further cooling is effected by heat exchange with degassed boiler feed water which subsequently is supplied to the evaporator, then by heating of the boiler feed water degassing plant, and for preheating the fresh boiler feed water before introducing the same into the degassing plant. Degassing is effected purely physically by heating of the boiler feed water. Subsequently, the synthesis gas is cooled by an air cooler and then by a cooler operated with cooling water almost to ambient temperature. In a condensate separator the condensate formed in the preceding cooling stages then is separated from the synthesis gas, and the synthesis gas is guided to the further treatment. Within the process, the condensate is used for steam generation. Depending on the purity of the condensate and the purity requirements of the export steam, it is either kept separate from the fresh boiler feed water, evaporated in a separate evaporator to obtain feed steam, or it is passed into the boiler feed water degassing plant and mixed there with the fresh boiler feed water.

A disadvantage of this process according to the prior art consists in that the condensate is separated from the synthesis gas with ambient temperature and correspondingly much thermal energy must be expended for heating the same for evaporation.

DESCRIPTION OF THE INVENTION

It therefore is the object of the invention to provide a process and a plant in which less thermal energy must be expended for heating the condensate.

This object is solved by certain embodiments of the invention as described herein.

Process According to an Embodiment of the Invention

A process for cooling a synthesis gas produced by catalytic steam reformation of a hydrocarbonaceous feed gas, which is cooled by heat exchange with boiler feed water for its conversion into steam, by separating the resulting aqueous condensate, and has been treated in a plant for the catalytic conversion of carbon monoxide with steam into hydrogen and carbon dioxide, wherein cooling is effected in that the gas passes through several series-connected cooling stages and comprises the heat exchange with the feed gas, with degassed and non-degassed boiler feed water for generating the steam required for the steam reformation, and with ambient air, and wherein cooled condensate obtained after the last cooling stage is separated from the gas and the gas is discharged for the further treatment, wherein at least after a further cooling stage upstream of the last cooling stage a further hot aqueous condensate is separated from the gas.

Plant According to an Embodiment of the Invention

A plant for cooling a synthesis gas produced by catalytic steam reformation of a hydrocarbonaceous feed gas, which is cooled by heat exchange with boiler feed water for its conversion into steam, by separation of the resulting aqueous condensate, and has been treated in a plant for the catalytic conversion of carbon monoxide with steam into hydrogen and carbon dioxide, comprising several series-connected heat exchangers for the heat exchange with the feed gas, with degassed and non-degassed boiler feed water for generating the steam required for the steam reformation, and with ambient air, and wherein cooled condensate obtained after the heat exchanger of the last cooling stage is separated from the gas by means of a condensate separator and the gas is discharged for the further treatment, wherein at least after a further heat exchanger upstream of the heat exchanger of the last cooling stage a further condensate separator is installed, in order to separate hot aqueous condensate from the gas.

From the part of the condensate which according to the invention already has been separated from the synthesis gas before the last cooling stage less thermal energy is withdrawn, and correspondingly less thermal energy is required for heating the same.

PREFERRED ASPECTS OF THE INVENTION

A particular aspect of the invention is characterized in that all cooling waters used for cooling the synthesis gas subsequently are utilized as boiler feed water. The hot condensate separated according to the invention is not cooled. As a result, the heat exchanger operated with cooling water, which is used according to the prior art, for cooling the synthesis gas to ambient temperature can be omitted. Possibly, a slight adaptation of the upstream heat exchangers is required. The omission of the use of cooling water, which is not used as boiler feed water and thus serves for generating steam, is very advantageous in particular in plant locations in water-scarce countries. In addition, this avoids the costs and the space requirement for the cooling water circuit as well as for pumps and a cooling tower.

Another particular aspect of the invention is characterized in that the first cooling stage in flow direction of the synthesis gas is represented by heat exchange with the feed gas, the second stage by heat exchange with degassed boiler feed water, the third stage by heat exchange with the ambient air by means of an air cooler, and the last stage by heat exchange with the non-degassed boiler feed water. Due to this order, the thermal energy contained in the synthesis gas is effectively transmitted to the feed streams of gas and water.

Another particular aspect of the invention is characterized in that the first cooling stage in flow direction of the synthesis gas is represented by heat exchange with the feed gas, the second stage by heat exchange with degassed boiler feed water, the third stage by heat exchange with the non-degassed boiler feed water, and the last stage by heat exchange with the ambient air by means of an air cooler. Due to this order, the thermal energy contained in the synthesis gas likewise is effectively transmitted to the feed streams of gas and water. In the individual case of the plant to be planned and operated, the order of the cooling steps can be adapted to the respectively existing marginal conditions.

Another particular aspect of the invention is characterized in that the hot aqueous condensate is separated from the synthesis gas after the heat exchange with the ambient air. At this point the condensate is cooled to such an extent that it can be re-used and pumped without too much technical expenditure. In addition, the amount of condensate obtained and its temperature at this point is high enough to save energy for cooling and re-heating of the condensate to an economically interesting extent.

Another particular aspect of the invention is characterized in that both condensates separated from the synthesis gas are supplied to the boiler feed water degasification and are combined there with fresh boiler feed water preheated by heat exchange with the synthesis gas. With this procedure it is accepted that impurities with which the condensate always is contaminated get into the boiler feed water and hence also into the export steam generated. This only is possible when the use of the export steam permits. The advantage of this procedure consists in that a separate steam generation, only from condensate, is omitted and hence costs and space are saved.

Another particular aspect of the invention is characterized in that the thermal energy for the boiler feed water degasification at least partly is supplied by heat exchange of the synthesis gas to be cooled. In this variant, the boiler feed water is heated not only before and after the degasification by the synthesis gas, but also during the degasification. This is an alternative to heating the boiler feed water during the degasification by introducing steam generated process-internally.

Another aspect of the invention consists in the use of the degassed boiler feed water for generating export steam and at least a part of the feed steam used for the catalytic steam reformation, wherein the boiler feed water is preheated by heat exchange with the synthesis gas and subsequently is evaporated in a steam generator also heated by heat exchange with the synthesis gas. In many cases, the thermal energy supplied by the synthesis gas is not sufficient for heating the steam generator. In many cases, the thermal energy of the waste gases of the burners, which heat the steam reformation reactor (SMR), additionally is used for this purpose.

Another aspect of the invention consists in the use of the condensates generated by a process as described herein as feed water for the generation of at least a part of the feed steam used for the catalytic steam reformation, wherein both condensates are combined, heated in a preheater and subsequently evaporated in a process condensate evaporator. The evaporator in many cases is heated by steam process-internally generated from fresh boiler feed water.

BRIEF DESCRIPTION OF THE DRAWINGS

Further features, advantages and possible applications of the invention can also be taken from the following description of an exemplary embodiment and numerical example as well as the drawing. All features described and/or illustrated form the subject-matter of the invention per se or in any combination, independent of their inclusion in the claims or their back-reference.

The process according to the invention will be explained below with reference to FIGS. 1 to 3 of the drawing, in which.

DETAILED DESCRIPTION OF THE INVENTION

Figure 1:
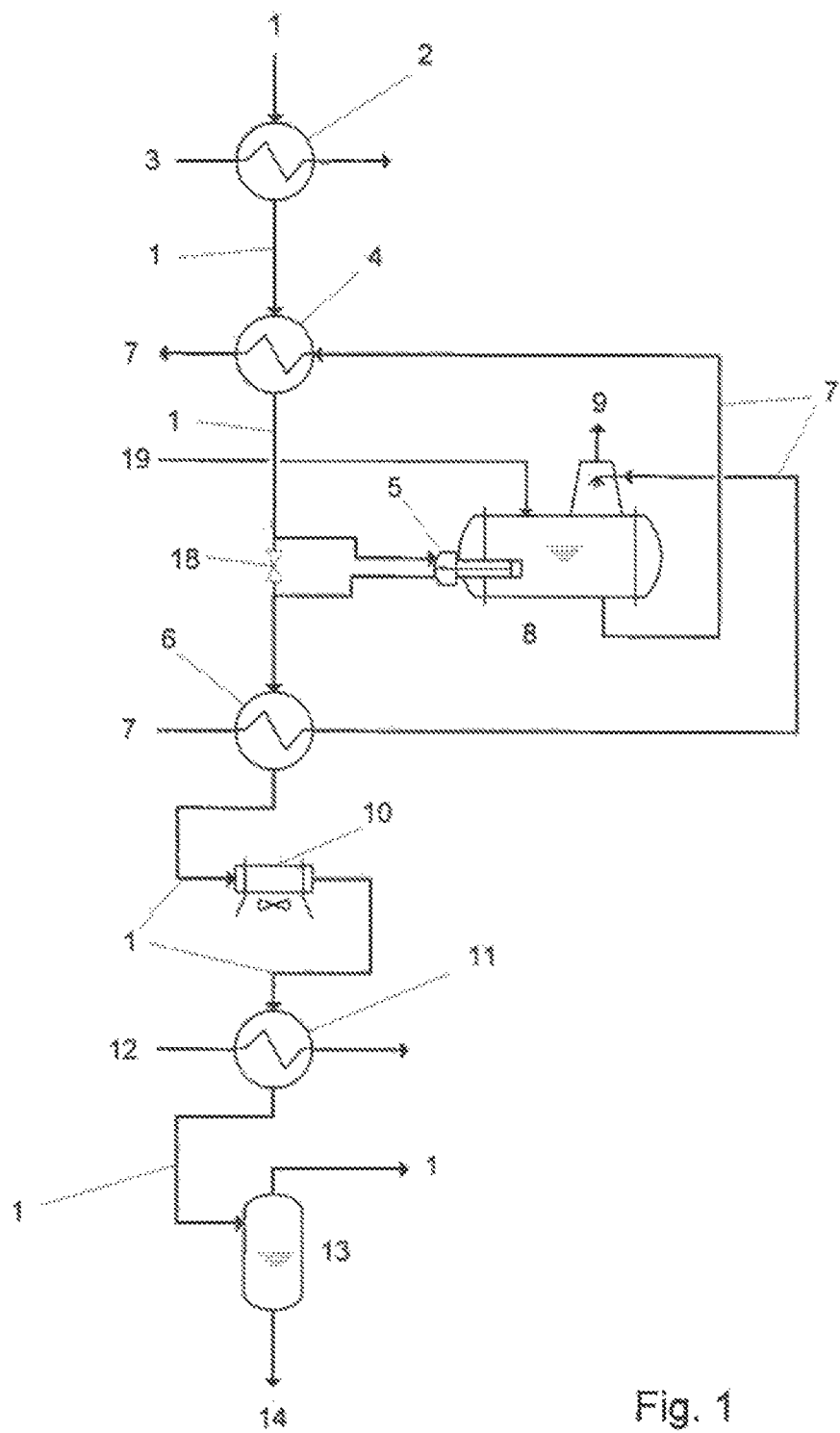
FIG. 1 shows a flow diagram of the prior art.

FIG. 1:

The synthesis gas 1 is cooled to a temperature of 360° C. by heat exchange and evaporation of boiler feed water to feed steam and export steam (not illustrated in FIG. 1) and is introduced into the heat exchanger 2. There, it gives off heat to the natural gas stream 3 which as feed gas is supplied to the steam reformation (not illustrated). The synthesis gas 1 then is passed through the heat exchangers 4, 5 and 6 and thereby heats boiler feed water 7 generated from fresh water. The heat exchanger 5, which serves for heating the degasser 8, can be bypassed by the bypass 18. Via conduit 19, the degasser 8 then can be heated with steam from a process-external source. The boiler feed water 7 is physically degassed in the degasser 8, i.e. by heating. The gases 9 driven out are discharged from the degasser 8 and supplied to the further treatment (not illustrated). After the degassed boiler feed water 7 has been heated up further in the heat exchanger 4, it is supplied to the evaporation (not illustrated), wherein it is converted to feed steam for the steam reformation. From the heat exchanger 6 the synthesis gas 1 is supplied to the air cooler 10 in which it is cooled further by giving off heat to the ambient air. In the heat exchanger 11 the synthesis gas 1 then is cooled further with cooling water 12, down to close to ambient temperature, for example 40° C. The synthesis gas 1 then is passed through the condensate separator 13. The condensate 14 separated from the synthesis gas 1 is supplied to the further use (not illustrated). The further use in many cases consists in the fact that the condensate 14 is used for generating feed steam for the steam reformation.

After the condensate separation 13, the synthesis gas 1 is supplied to the further treatment (not shown).

Figure 2:
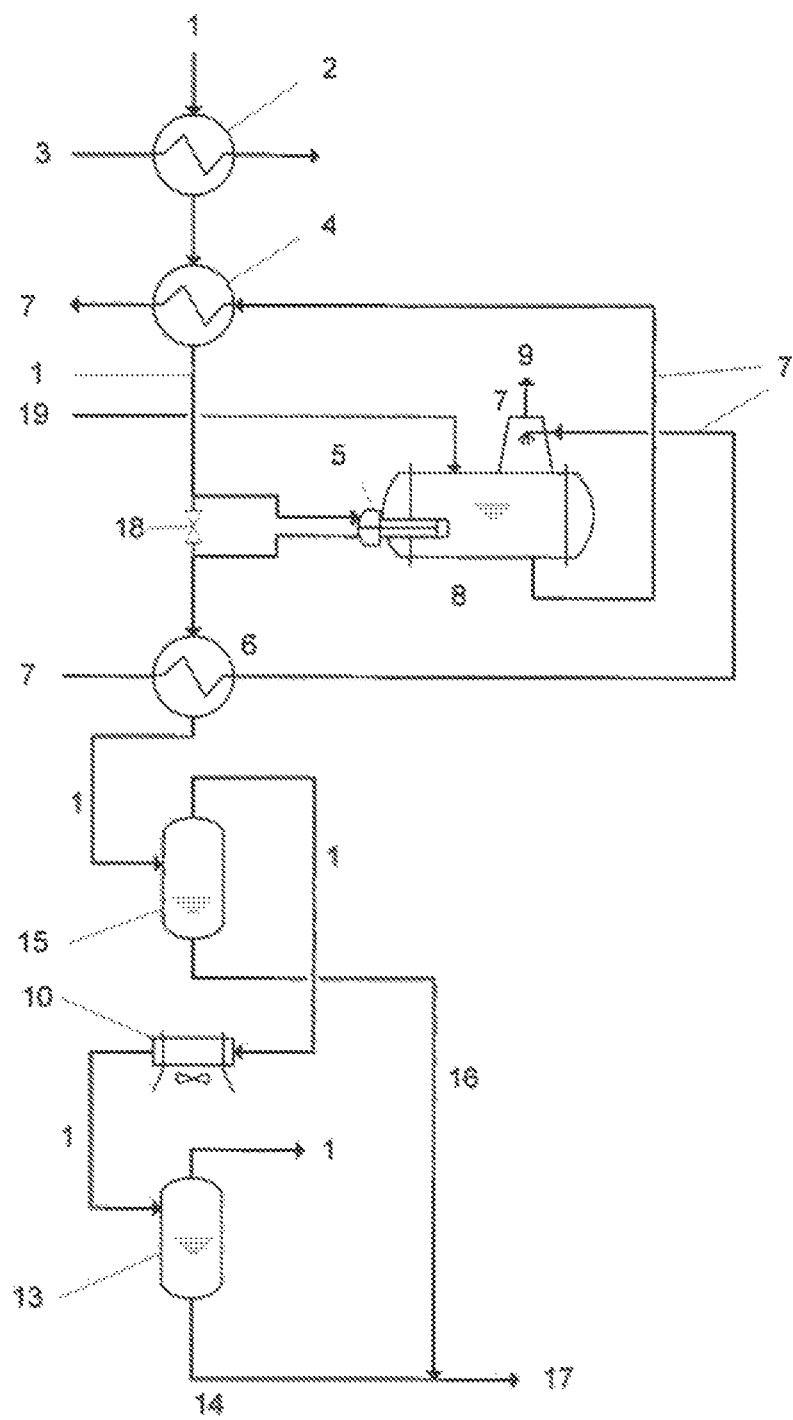
FIG. 2 and FIG. 3 each show a flow diagram of an exemplary embodiment of the invention.

FIG. 2:

FIG. 2 shows the additional condensate separation according to the invention from the synthesis gas 1 by means of the condensate separator 15, after said synthesis gas has been cooled to about 95° C. in the heat exchanger 6. The separated condensate 16 likewise has a temperature of 95° C. After the condensate separation in the air cooler 10', the synthesis gas 1 is cooled to close to ambient temperature. Subsequently, the condensate 14 obtained in this last cooling step is separated from the synthesis gas 1 in the condensate separator 13. The heat exchanger operated with cooling water has been omitted. The streams of the cold condensate 14 and the hot condensate 16 are combined and as condensate stream 17 supplied to the evaporation to feed steam (not illustrated).

Figure 3:
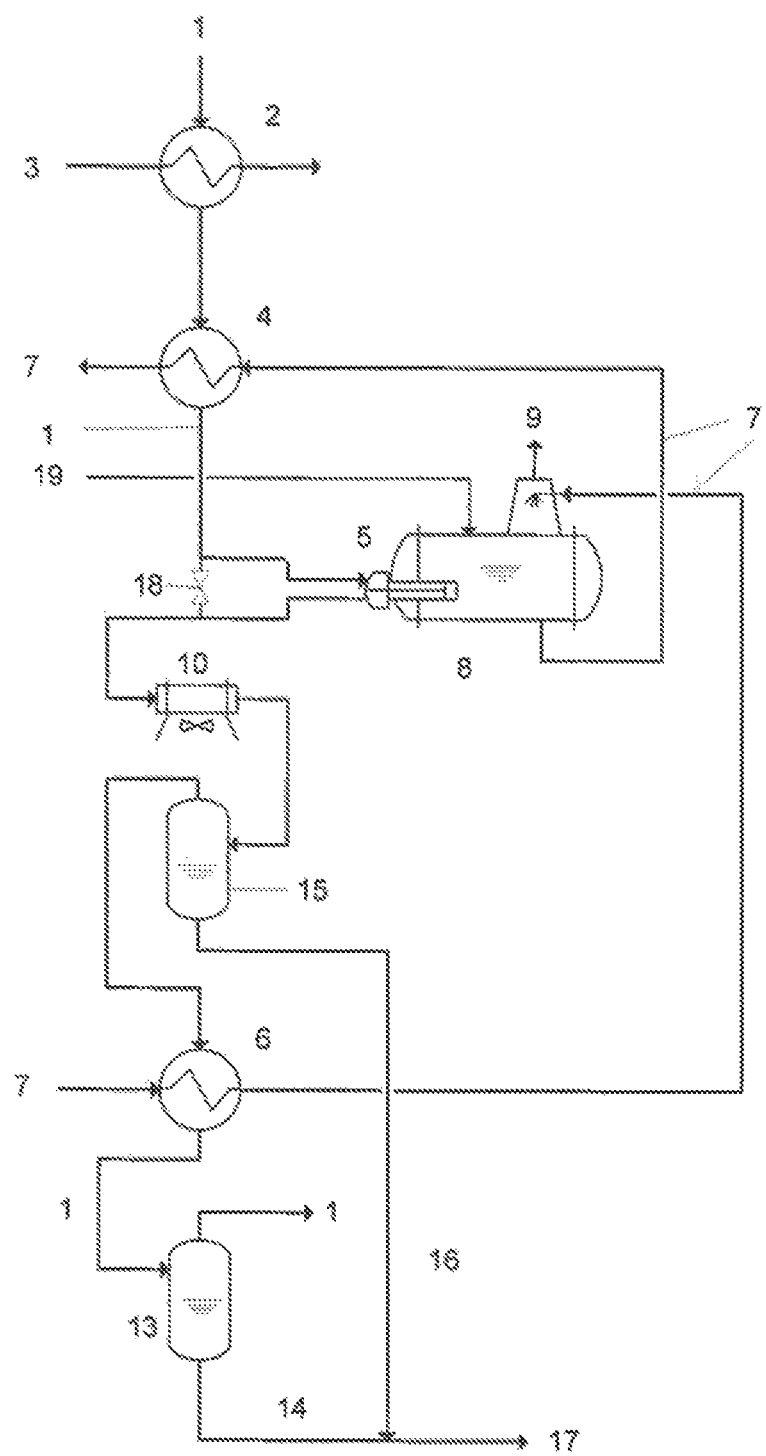

FIG. 3:

FIG. 3 shows a variant of the cooling of the synthesis gas according to an embodiment of the invention. As compared to the configuration in FIG. 2 merely the order of the last two cooling steps is reversed, i.e. after the synthesis gas has heated the degasser 8 it is cooled with an air cooler 10 and then, in the last cooling step, the heat exchange against boiler feed water not degassed yet, which subsequently is supplied to the degasser 8, is effected.

In a particular aspect of the invention as shown in FIG. 2 or 3, the heat exchange of the synthesis gas to be cooled with the boiler feed water in the degasser also can be omitted (not illustrated). This can be effected by actuating the bypass 18 or even by omitting the heat exchanger 5. In this way, an even hotter condensate can be obtained, whose thermal energy can be recovered or be reused even better. In addition, the investment costs are reduced when omitting the heat exchanger 5.

INDUSTRIAL APPLICABILITY

The invention leads to a saving of energy and investment costs in the process for the further cooling of synthesis gas as it is widely used industrially. It hence is industrially applicable.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

LIST OF REFERENCE NUMERALS 1 synthesis gas
2 heat exchanger
3 natural gas
4 heat exchanger
5 heat exchanger
6 heat exchanger
7 boiler feed water, fresh
8 degasser
9 gases driven out
10 air cooler
11 heat exchanger
12 cooling water
13 condensate separator
14 condensate
15 condensate separator
16 condensate
17 condensate
18 bypass with valve
19 steam

The invention claimed is:

1. A process for cooling a synthesis gas produced by catalytic steam reformation of a hydrocarbonaceous feed gas, cooling the synthesis gas by heat exchange with boiler feed water to produce steam;
   treating the synthesis gas in a plant for the catalytic conversion of carbon monoxide with steam into hydrogen and carbon dioxide;
   cooling the synthesis gas by passing the synthesis gas through several series-connected cooling stages to form a cold synthesis gas, wherein the several series-connected cooling stages comprise heat exchange with (1) the hydrocarbonaceous feed gas, (2) a degassed boiler feed water, (3) a non-degassed boiler feed water for generating steam used during production of the synthesis gas, and (4) ambient air;

introducing the cold synthesis gas to a final phase separator under conditions effective for producing a cooled condensate at a bottom of the final phase separator and a dry synthesis gas at a top of the final phase separator;

wherein the synthesis gas is introduced to a first phase separator prior to the last cooling stage under conditions effective for producing a hot condensate at a bottom of the first phase separator and the synthesis gas at a top of the first phase separator, wherein the synthesis gas is discharged from the top of the first phase separator and cooled in the remaining series-connected cooling stages; and combining the hot condensate with the cooled condensate to form a warm condensate, wherein the warm condensate is at a temperature higher than the cold condensate.

2. The process according to claim 1, wherein all cooling waters used for cooling the synthesis gas subsequently are utilized as boiler feed water.

3. The process according to claim 1, wherein the first cooling stage in flow direction of the synthesis gas is represented by heat exchange with the hydrocarbonaceous feed gas, the second stage by heat exchange with degassed boiler feed water, the third stage by heat exchange with the non-degassed boiler feed water, and the last stage by heat exchange with the ambient air by means of an air cooler.

4. The process according to claim 1, wherein the first cooling stage in flow direction of the synthesis gas is represented by heat exchange with the hydrocarbonaceous feed gas, the second stage by heat exchange with degassed boiler feed water, the third stage by heat exchange with the ambient air by means of an air cooler, and the last stage by heat exchange with the non-degassed boiler feed water.

5. The process according to claim 4, wherein the hot aqueous condensate is separated from the synthesis gas after the heat exchange with the ambient air.

6. The process according to claim 5, wherein thermal energy for the boiler feed water degasification at least partly is supplied by heat exchange with the synthesis gas to be cooled.

7. The process according to claim 5, further comprising the step of using the degassed boiler feed water for generating export steam and at least a part of the hydrocarbonaceous feed steam used for the catalytic steam reformation, wherein the degassed boiler feed water is preheated by heat exchange with the synthesis gas and subsequently is evaporated in a steam generator also heated by heat exchange with the synthesis gas.

8. The process according to claim 1, wherein the warm condensate is supplied to the boiler feed water degasification and are combined there with fresh boiler feed water preheated by heat exchange with the synthesis gas.

9. The process according to claim 1, further comprising the step of using the warm condensate as feed water for the generation of at least a part of the hydrocarbonaceous feed steam used for the catalytic steam reformation, wherein the warm condensate is heated in a preheater and subsequently evaporated in a process condensate evaporator.

10. A process for cooling a synthesis gas produced by catalytic steam reformation of a hydrocarbonaceous feed gas, wherein the synthesis gas is cooled by heat exchange with boiler feed water for conversion into steam, wherein the synthesis gas is further treated in a plant for the catalytic conversion of carbon monoxide with steam into hydrogen and carbon dioxide, wherein cooling is effected in that the synthesis gas passes through several series-connected cooling stages and comprises the heat exchange with the hydrocarbonaceous feed gas, with degassed and non-degassed boiler feed water for generating steam used for the catalytic steam reformation, and with ambient air, and wherein a cooled condensate obtained after the last cooling stage is separated from the synthesis gas and the dry synthesis gas is discharged for the further treatment, wherein at least after a further cooling stage upstream of the last cooling stage a further hot aqueous condensate is separated from the synthesis gas.

* * * * *